March 29, 1949.　　　　G. R. ELLIOTT　　　　2,465,714
MULTIPLE STAGE POWER MECHANISM
Filed June 14, 1943
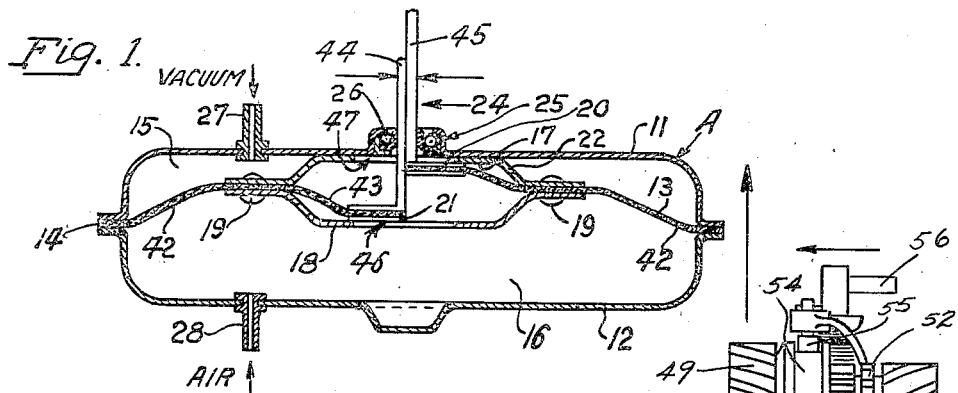
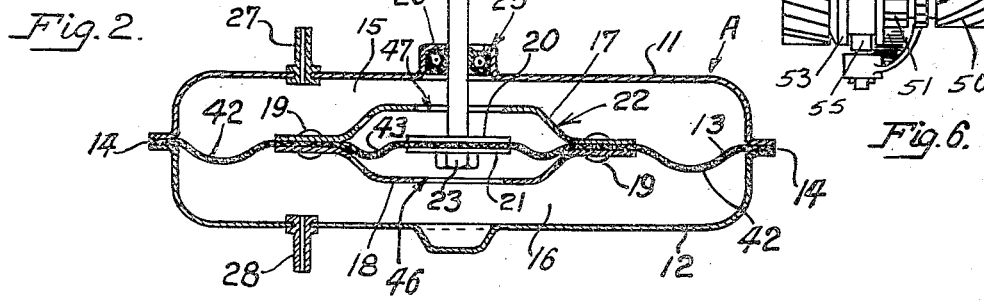
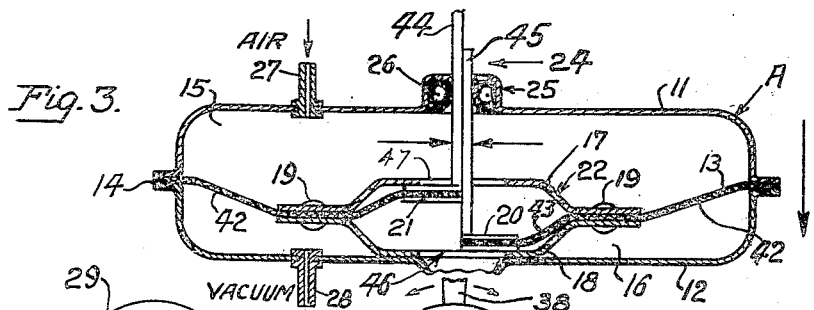
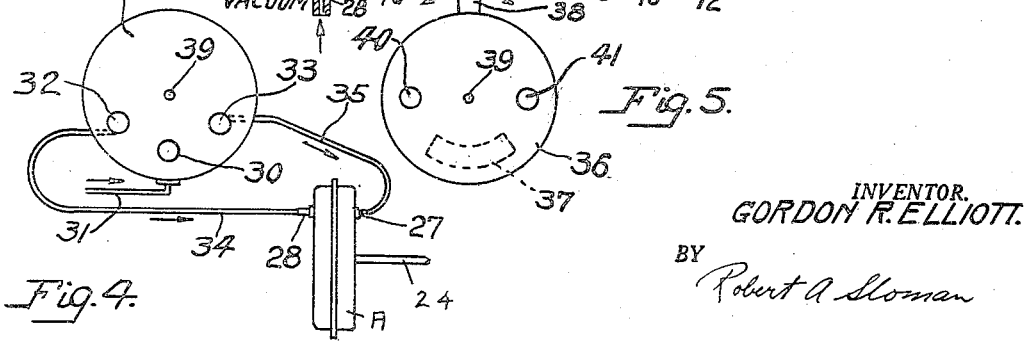
INVENTOR.
GORDON R. ELLIOTT.
BY Robert A. Sloman Patented Mar. 29, 1949

2,465,714

UNITED STATES PATENT OFFICE 2,465,714

MULTIPLE STAGE POWER MECHANISM

Gordon R. Elliott, Ferndale, Mich., assignor, by mesne assignments, to Irving A. Puchner and Edward U. Demmer, Milwaukee, Wis.

Application June 14, 1943, Serial No. 490,955

9 Claims. (Cl. 137—157)

This invention relates to multiple stage power mechanisms, and more particularly to a two stage power stroke vacuum chamber. Heretofore in many fields of mechanical endeavor it was desirous to supply power in multiple stages, however present devices for accomplishing this purpose have been unduly complicated by the use of springs and other unnecessary equipment, particularly where it may be desirous to have a multiple stage power mechanism which will operate positively in two directions.

For instance in the case of a two speed truck axle it is desired to accomplish shifting of power from one speed to the other; and in the transferring of power from one gear to another it is usually desirable to obtain a relatively fast disengagement of one, and a relatively slow engagement of the other.

Consequently a multiple stage power mechanism is desirable which will first exert a relatively strong force in one direction, and then successively exert a relatively lesser force in the same direction.

Furthermore in shifting back from the second speed to the first speed it is again desirable to have a fast disengagement in the opposite direction from said second speed, and then a successive relatively slow engagement of gears back into the first speed.

It is the object of the present invention to provide positive vacuum means for accomplishing the above purposes whereby a multiple stage power stroke is obtainable in one direction, and then in the opposite direction.

It is the object of the present invention to employ a suitable vacuum chamber with a movable power shaft actuating member provisioned therein, together with flexible sealing means for supporting said actuating member within said chamber.

It is the further object herein to provide a secondary chamber supported within said first mentioned chamber movable therein for causing initial movement of said actuating member, and for also providing relative secondary movement of the actuating member with respect to said secondary chamber.

It is the further object of this invention to provide said secondary chamber within said first chamber to provide two separate chambers therein on opposite sides of said secondary chamber, said actuating member being centrally supported within said secondary chamber to provide separate chambers on either side thereof.

This invention therefore relates to the various arrangements of elements and their combinations hereafter described in detail in connection with the annexed drawings of which:

Fig. 1 is an elevational section of the vacuum chamber showing the two stage strokes of the power shaft actuating member.

Fig. 2 is an elevational section thereof in a central position.

Fig. 3 is a similar view showing the two stage power strokes in the opposite direction.

Fig. 4 is a diagrammatic view of the pneumatic connections for the vacuum chamber.

Fig. 5 is a plan view of a hand operated rotatable member of the control valve;

Fig. 6 is a fragmentary elevational view of a gear shifting mechanism to which said vacuum chamber is adapted.

It will be understood that the above drawings illustrate merely preferable embodiments of the invention and that other embodiments are contemplated within the scope thereof as hereinafter described and claimed.

Referring to the drawings the vacuum chamber A consists of the two oppositely disposed chamber members 11 and 12 between which is secured and retained the flexible yielding diaphragm 13 at its peripheral edge 14, to thereby provide the two independent chambers 15 and 16.

The two oppositely arranged outwardly recessed disc members 17 and 18 are centrally provisioned within chamber members 11 and 12, and on opposite sides of diaphragm 13, being centrally secured thereby by rivets 19.

Plates 20 and 21 forming a power shaft actuating member are centrally provisioned within disc members 17 and 18 which form a secondary chamber 22, within chamber A, being secured on opposite sides of diaphragm 13 and secured thereto by the nut 23 threaded upon the end of power shaft 24.

Said power shaft adaptable to two stage power strokes in opposite directions, as hereafter described, is slidably provisioned through the outer chamber member 11, which is outwardly recessed at 25 for receiving the air and vacuum sealing members 26.

Access of either air or vacuum to the outer chamber A is provided by the hollow hose connections 27 and 28 suitably secured to chamber members 11 and 12 respectively, connection 27 providing communication from the exterior to chamber 15, and connection 28 providing communication to chamber 16.

As hereinafter described in connection with the operation of the two stage power stroke vacuum chamber, it is desirable at one time to provide air or vacuum to connection 27, and at the same time provide vacuum or air respectively to the chamber connection 28.

This is accomplished by a manually operable valve shown in Fig. 4 wherein the stationary housing or base member 29 has a vacuum opening 30, to which communication with an exterior vacuum source is made through conduit 31.

Outlet ports 32 and 33 are provided in spaced relation upon opposite sides of vacuum opening 30 within valve housing 29, being respectively joined by conduits 34 and 35 providing pneumatic communication to the connections 28 and 27 within chamber members 12 and 11.

A manually operable rotatable disc member 36 shown in Fig. 5 is adapted to be rotatably provisioned upon valve housing 29 around axis 39 whereby the arcuate recess 37 in the under surface of said disc is adapted to establish vacuum communication between vacuum port 30 and either outlet port 32 or 33 depending upon the rotated position of disc 36 by actuation of handle 38.

With handle 38 pivoted around axis 39 to the left vacuum communication is through port 30, recess 37, outlet port 33 and conduit 35. On the other hand a rotation of disc 36 by handle 38 to the right provides a vacuum communication through port 30, recess 37, outlet port 32 and conduit 34 to the opposite side of vacuum chamber A. Consequently it is seen that an arcuate movement from either extreme position to the other will change vacuum communication to chamber A from one conduit to the other.

Air ports 40 and 41 provisioned through disc 36 are adapted to provide an air supply respectively to the outlet ports 32 and 33 whereby with disc handle 38 turned to the left port 40 registers with outlet port 32 providing air through conduit 34; and it will be noted that at the same time vacuum is provided through conduit 35.

On the other hand with handle 38 pivoted to the right air port 41 registers with outlet port 33 to supply air out through conduit 35; while at the same time vacuum communication is established through conduit 34. Thus it is seen that for the operation of the two stage vacuum chamber A air or vacuum communication may be established to either chamber 15 or 16, and for instance, at the same time as air is provided to chamber 15 vacuum communication is established with chamber 16, or vice versa.

*Operation*

In Fig. 2 the power shaft 24 is in a central position. If hand member 38 is pivoted to the left air will travel through conduit 34 and enter chamber 16; and simultaneously vacuum communication will be established through conduit 35 to chamber 15 as indicated in Fig. 1.

By virtue of the flexibility of diaphragm 13 and its extra surface as indicated at 42 in Fig. 2, diaphragm 13 by action of the air upon its surface is forced upwardly with a relatively strong force, in view of the vacuum on the other side thereof, carrying with it the secondary chamber 22, which limits the movement by disc member 17 engaging the inner wall of the chamber 11. It will be noted that the outer or greater surface portion 42 of the diaphragm 13 is forced operatively to its extreme position while the inner surface portion at 43 of said diaphragm is retained against movement in the first stage by the resistance to movement of power shaft 24.

In the first stage, then the inner surface 18 of chamber 22 engages the actuating member 20, 21 causing a forceful partial displacement thereof from its central position as shown in Fig. 2. This first stage power stroke is shown in Fig. 1 with shaft 24 split into the portions 44 and 45. The position 44 indicates the first stage stroke of shaft 24 actuated by the secondary chamber member 22 limited in its movement by disc 17 engaging chamber member 11.

It will be understood however that the first stage movement is assisted substantially by the air pressure also upon the inner portion 43 of diaphragm 13. While this portion of the diaphragm alone may not be adequate to obtain in itself the movement required, yet this force cooperates substantially with the force exerted by the outer portion 42 of diaphragm 13. In other words for the first stage stroke the entire area of diaphragm is effected, while for the second stage only the inner area 42 of diaphragm 13 is effective.

However the second stage stroke then results from the action of air upon the under side of diaphragm 13 at the central portion thereof within chamber 22 indicated generally at 43, air communication being established thereto from chamber 16 and through the central opening 46 in disc member 18.

The second stage power stroke is indicated by the position 45 of shaft 24, wherein the actuating member 20, 21 carried by the central portion 43 of diaphragm 13 is now in its extreme upward position.

In view of the combined surfaces of the outer portion 42 of diaphragm 13 and its inner central portion 43 as compared with the relatively small surface area of portion 43 of diaphragm 13, it is readily seen that the initial or first stage stroke will be much greater in forceful effect, than the effect of the central portion 43 alone.

Thus the first stage movement of shaft 24 indicated at 44 is caused by the disc member 18 forcibly engaging and pushing the actuating member 20, 21 with a relatively great force. At the same time, however, this movement is substantially assisted by the action of the air upon the central portion 43 of diaphragm 13. Immediately thereafter, and at the end of the first stage stroke, a secondary and much weaker application of force is applied to actuating member 20, 21 through the portion 43 of diaphragm 13 within secondary chamber 22.

On the other hand this first and second stage movement may be established in the opposite direction, the result of which is indicated in Fig. 3, it being understood that this change of direction can be accomplished progressively from one direction to the other.

By throwing the handle 38 of disc 36 to the right the reverse condition will exist, with air being supplied through conduit 35 to chamber 15, and with vacuum communication established through conduit 34 to chamber 16. Under these conditions the first stage movement indicated at 44 on shaft 24 in Fig. 3, is caused by the action of air upon portion 42 of diaphragm 13 which, as above explained, causes a downward movement of the secondary chamber 22 carrying with it the actuating member 20, 21 forcibly engaged by member 17 which forms a part of chamber 22. It will be understood, as above explained, that this movement is also substantially assisted by the downward action of the air upon the central area 43 of diaphragm 13.

Again the second and much less forceful stage movement or stroke is accomplished by the action of air through the central opening 47 in disc 17, upon portion 43 alone of diaphragm 13 within chamber 22, urging member 20, 21 and shaft 24 to the second stage position 45 as indicated in Fig. 3.

It will be noted that portion 43 of diaphragm 13 within chamber 22 as shown in Fig. 2 is so provisioned as to permit its movement to the extreme position shown by the second stage movement 45 in Figs. 1 and 3. Because of its limited surface area and because of the force of member 20, 21 resisting initial movement, it is readily seen that the first stage and most powerful movement is through the outer portion 42 of diaphragm 13 and also its inner portion 43, while the second stage stroke is limited to air acting upon only area 43.

Here again it is seen that the first stage stroke is limited in its movement by the disc member 18 engaging the inner surface of chamber member 12. With chamber 22 now stationary, further movement of actuating member 20, 21 is possible in the second stage stroke, by the further relative movement of the portion 43 of diaphragm 13 within chamber 22.

The two stage power strokes above described in either direction, with the first relatively of great force, and with the second of relative small force, are adapted in the first instance to provide a quick movement of power shaft 24, while in the second instance a relatively slow movement of shaft 24.

Consequently the two stage power stroke vacuum chamber is adapted to any number of mechanical operations, as for instance the shifting of gears out of engagement rapidly, and shifting into other gears relatively slowly.

For instance, referring to Fig. 6 a power shaft 48 is shown fragmentarily carrying the high speed idler gear 49 and the low speed idler gear 50. Though not shown in the drawing, it is understood that idler gears 49 and 50 are adapted to mesh with corresponding gears, for instance, in the driving axle of a truck or other vehicle.

Shaft 48 carries the annular splined member 51, while each of the gears 49 and 50 also carry corresponding splines, as for instance spline 52 of gear 50. Though not shown a similar spline is carried on the inner end of gear 49.

The circular hollow clutch member 53 with annular recess 54, is correspondingly splined upon its inner surface adaptable for meshing engagement with the shaft spline 51, and the splines carried by either the idler gears 49 or 50.

Members 55 nesting within recess 54 are pivotally carried by the clutch actuating member 56 whereby a force transmitted thereto to the left will cause a corresponding movement to the left of clutch member 53. This results in the spline member of clutch 53 engaging both the spline member 51 of shaft 48 and also the corresponding spline carried by idler gear 49. Thus power is transmitted through shaft 48 to idler gear 49 which is adapted to further transmit high speed movement to for instance a corresponding gear on the drive axle of a truck or other vehicle.

Similarly a translation to the right of clutch actuating member 56 causes a movement to the right of clutch 53 causing a disengagement of idler gear 49, in one stage or stroke, and a subsequent engagement of idler gear 50, with the spline of the clutch engaging shaft splines 51 and gear splines 52.

Power is thus transmitted to the low speed idler gear 50 for driving through suitable gearing not shown, the drive axle of a truck or other vehicle. The present invention is therefore adaptable, among many other purposes, to the two stage actuation of the clutch actuating member 56 to cause two stage movement either to the right or to the left; or successively two stage movement to the right, and then two stage movement to the left.

In the shifting of gears it is desirable to obtain a quick and forceful disengagement of one idler gear which is accomplished by the power chamber above described operating through power shaft 24 suitably connected to the clutch actuating member 56; and then successively a relatively slow engagement of the other idler gear, which is accomplished by the second stage or stroke movement of power shaft 24 as above described in detail.

It will be understood that the two stage stroke movements could be accomplished by the use of fluids other than air, as for instance oil or water. Or on the other hand such movement is feasible by establishing pressure differentials within the vacuum chamber in any other convenient manner.

Having described my invention reference should now be had to the claims which follow for determining the scope thereof.

I claim:

1. A multiple stroke power mechanism comprised of a housing, movable flexible means disposed in said housing and sealed with respect thereto at its periphery so as to form with said housing opposed pressure chambers, a secondary chambered housing provisioned on opposite sides of said flexible means, supported thereby and movable therewith, communicating means between the several corresponding ends of the two housings, and a transversely movable power shaft operably engageable by said secondary housing secured upon one end to said means within said secondary housing for movement relative to said secondary housing, and with its other end projecting outwardly through both said housings.

2. A multiple stroke power mechanism comprised of a housing, a secondary chambered housing movably provisioned therein, a movable flexible means disposed in said housing and sealed with respect thereto at its periphery thereby providing separate chambers on opposite sides thereof, also disposed through said secondary housing for movably supporting the same, and also providing separate chambers on opposite sides thereof, communicating means between the several corresponding ends of the two housings, and a transversely movable power shaft operably engageable by said secondary housing, secured upon its inner end to said means within said secondary housing for movement relative to said secondary housing, with its other end projecting outwardly through both said housings.

3. A multiple stage power mechanism comprised of a housing, a flexible diaphragm disposed in said housing and sealed with respect thereto at its periphery thereby providing separate chambers on opposite sides thereof, being adaptable to movement toward the housing wall of either of said chambers upon the existence of a pressure differential on opposite sides of said diaphragm, a secondary housing centrally provisioned within said housing, and through which said diaphragm is disposed for supporting and carrying the same, providing separate chambers on opposite sides thereof, communicating means between the several corresponding ends of the two housings, and a transversely movable power shaft operably engaged by said secondary housing secured upon one end to said diaphragm within said secondary housing for movement relative to said secondary housing, with its other end projecting outwardly through both said housings.

4. A multiple stage power mechanism comprised of a housing, flexible means disposed in said housing and sealed with respect thereto at its periphery thereby providing separate chambers on opposite sides thereof being adaptable to movement toward the housing wall of either of said chambers upon existence of a pressure differential on opposite sides of said means, a secondary housing centrally provisioned on opposite sides of said flexible means and movably supported thereby, communicating means between the several corresponding ends of the two housings, and a transversely movable power shaft operably engageable by said secondary housing secured upon its inner end to said flexible means within said secondary housing for movement relative to said secondary housing, and with its outer end projecting outwardly through both said housings, said housing having ports on opposite sides thereof for establishing air communication to one side of said flexible means and vacuum communication to the other side thereof.

5. A multiple stroke power mechanism comprised of a housing, movable flexible means disposed in said housing and sealed with respect thereto at its periphery, a secondary housing provisioned on opposite sides of said flexible means, supported thereby and movable therewith, communicating means between the several corresponding ends of the two housings, power shaft actuating means carried by said flexible means within said secondary housing, operably engageable by said secondary housing for first stage movement with said secondary housing upon movement of said flexible means, and adapted to successive second stage movement relative to said secondary housing on engagement of said secondary housing with said first mentioned housing, and a longitudinally translatable power shaft secured to said actuating means.

6. A multiple stroke power mechanism comprised of a housing, movable flexible means disposed in said housing and sealed with respect thereto at its periphery, a secondary housing within said first housing provided upon opposite sides of said means, adaptable to movements with said flexible means, communicating means between the several corresponding ends of the two housings, and a longitudinally movable power shaft operatively engageable by said secondary housing secured upon one end of said flexible means within said secondary housing for movement relative to said secondary housing on engagement of said secondary housing with said first mentioned housing.

7. A multiple stroke power mechanism comprising a housing, movable flexible means sealed therein defining chambers on opposite sides thereof, means for establishing a pressure differential between said chambers to cause a relatively great first stage movement of said movable means, a secondary housing carried by and movable with said flexible means engageable with said first mentioned housing, the portion of said flexible means within said secondary housing being adapted for movement therewith, and successive less forceful relative second stage movement therein, communicating means between the several corresponding ends of the two housings, and a longitudinally movable power shaft engageable by said secondary housing and joined to said flexible means within said secondary housing.

8. A multiple stroke power mechanism comprised of a housing, movable flexible means disposed in said housing and sealed with respect thereto at its periphery, a secondary housing within said first housing, adaptable to movement with said movable means, communicating means between the several corresponding ends of the two housings, a longitudinally movable power shaft engageable by said secondary housing and joined to said flexible means within said secondary chamber for movement relative to said secondary housing on engagement of said secondary housing with said first mentioned housing, and an air sealing means interposed between said shaft and said first housing.

9. The combination, a housing, movable flexible means disposed in said housing and sealed with respect thereto to form chambers on opposite sides thereof, a second housing within said first housing positioned upon opposite sides of said flexible means for movement therewith, communicating means between the several corresponding ends of the two housings, and a longitudinally movable shaft secured upon one end to said flexible means within said second housing for movement therewith and for successive movement relatively thereto on engagement of said secondary housing with said first mentioned housing.

GORDON R. ELLIOTT.

REFERENCES CITED

The following references are of record in the file of this patent:

UNITED STATES PATENTS

| Number | Name | Date |
|---|---|---|
| 762,627 | Fink | June 14, 1904 |
| 1,130,884 | Blakey | Mar. 9, 1915 |
| 1,430,359 | Canion | Sept. 26, 1927 |
| 1,845,797 | Kearney | Feb. 16, 1932 |
| 2,064,379 | Kundig | Dec. 15, 1936 |
| 2,092,580 | Kelley | Sept. 7, 1937 |
| 2,197,075 | Fitzgerald | Apr. 16, 1940 |
| 2,260,491 | Stelzer | Oct. 28, 1941 |
| 2,307,910 | Baade | Jan. 12, 1943 |
| 2,367,852 | Eaton | Jan. 23, 1945 |

FOREIGN PATENTS

| Number | Country | Date |
|---|---|---|
| 479,434 | France | Jan. 4, 1916 |